(12) United States Patent
Enns et al.

(10) Patent No.: US 7,497,069 B2
(45) Date of Patent: Mar. 3, 2009

(54) CROP HARVESTING HEADER WITH REVERSIBLE DRIVE TO THE SICKLE KNIFE

(75) Inventors: John Edward Enns, East St. Paul (CA); Blair Zoski, Winnipeg (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 0 days.

(21) Appl. No.: 11/935,121

(22) Filed: Nov. 5, 2007

(65) Prior Publication Data

US 2008/0104937 A1    May 8, 2008

Related U.S. Application Data

(60) Provisional application No. 60/864,177, filed on Nov. 3, 2006.

(51) Int. Cl.
*A01D 69/00* (2006.01)
(52) U.S. Cl. ...................................................... 56/11.9
(58) Field of Classification Search ............ 60/445, 60/448, 519, 983, 487, 489, 431, 464, 449, 60/490, 433, 450, 447, 488; 417/286, 364, 417/212, 305, 469, 222.1, 53; 91/487, 486, 91/492, 491; 56/11.9, 16.4 R, 10.2 H, 11.2, 56/10.9; 460/16
See application file for complete search history.

(56) References Cited

U.S. PATENT DOCUMENTS

| | | | | |
|---|---|---|---|---|
| 4,168,612 A | * | 9/1979 | Nikolaus | 60/431 |
| 4,663,919 A | * | 5/1987 | Stroh et al. | 56/11.2 |
| 5,462,486 A | * | 10/1995 | Norton | 460/20 |
| 5,527,218 A | * | 6/1996 | Van den Bossche et al. | 460/20 |
| 5,791,128 A | * | 8/1998 | Rogalsky | 56/14.5 |
| 5,996,324 A | * | 12/1999 | Oligmueller | 56/11.2 |
| 6,247,296 B1 | * | 6/2001 | Becker et al. | 56/11.2 |
| 6,430,905 B2 | * | 8/2002 | Eis et al. | 56/11.2 |
| 6,722,112 B2 | * | 4/2004 | Pierce et al. | 56/11.2 |
| 6,895,734 B2 | * | 5/2005 | Ameye | 56/10.8 |
| 7,052,423 B2 | * | 5/2006 | Jonckheere et al. | 474/148 |
| 7,130,721 B2 | * | 10/2006 | Wear et al. | 700/282 |
| 2005/0279070 A1 | * | 12/2005 | Pirro et al. | 56/14.6 |

\* cited by examiner

*Primary Examiner*—Árpád Fábián-Kovács
(74) *Attorney, Agent, or Firm*—Adrian D. Battison; Ade & Company Inc.

(57) ABSTRACT

A crop harvesting header includes a sickle knife driven by a first hydraulic motor and a crop transfer system including three conveying drapers which is driven by at least one second hydraulic motor. A mechanical drive input from the combine harvester drives a first pressure regulated piston pump generating flow for the first motor and a second gear pump for the second motor. When the drive input is driven in the reverse direction, hydraulic fluid is supplied from the second pump in the reverse direction for driving the second motor in the reverse direction. As the first pump does not pump in the reverse direction the hydraulic control circuit is arranged such that, when the second pump is driven by the drive input in the reverse direction, hydraulic fluid is supplied from the second pump to the first motor for driving the first motor in the reverse direction.

7 Claims, 2 Drawing Sheets

CROP HARVESTING HEADER WITH REVERSIBLE DRIVE TO THE SICKLE KNIFE

This application claims priority under 35 U.S.C. 119 from U.S. Provisional Application Ser. No. 60/864,177, filed Nov. 3, 2006.

This invention relates to a crop harvesting header with a reciprocating drive to the sickle knife which is reversible to allow release of blockages which stall the knife

BACKGROUND OF THE INVENTION

On crop harvesting headers there is generally provided a header frame for mounting on a support vehicle for transport of the header across ground carrying a standing crop for harvesting, a sickle knife mounted across a forward end of the frame for cutting the standing crop, the sickle knife having a row of sickle blades which are movable in a reciprocating action relative to a row of sickle guards, a first drive mechanism for supplying driving rotation to the sickle knife for causing the reciprocating movement of the blades, a crop transfer assembly for transporting the cut crop from the knife along the frame to a discharge opening of the frame and a second mechanism motor for supplying driving rotation to the crop transfer assembly for driving the crop transfer assembly. A mechanical drive input is provided to receive a driving rotation from the vehicle on a suitable output shaft.

In many cases the drive to the transfer assembly and to the sickle knife are mechanical so that simply rotating the input in reverse acts to drive transfer assembly and the knife in reverse directions. This requirement is common in that blockages which occur on a periodic basis can often be cleared by reversing the drives without the necessity of the operator leaving the cab.

Sickle knives include a knife bar carrying a plurality of blades in a row which is reciprocated back and forth so that each blade reciprocates from a position aligned with one guard to a position aligned with the next adjacent guard. In this way the blade effects a cutting action with the side surfaces of the guard as it approaches one guard and then effects a second cutting action with the next adjacent guard as it moves back to its start position.

In regard to the knife, blockages can occur when too much crop enters between the knife blades and stalls the movement of the blades as they approach their cutting action with the guards. In other cases a rigid element can enter between two blades and block the movement of the blades. In both cases it is desirable to reverse the blades away from their stalled position adjacent one guard back away from the guard toward the next adjacent guard. This back-up releases the trapped material allowing it to fall out or at least be pulled out so that the blades can revert to their cutting action with the material removed.

It is in some cases desirable to replace the mechanical drive elements with hydraulic drives so that the mechanical input drives one or more hydraulic pumps which supply fluid to motors driving the knife drive and driving the transfer assembly. In this case the reversing of the mechanical input does not necessarily reverse the motor depending on the type of pumps selected and the circuit arrangement selected.

SUMMARY OF THE INVENTION

It is one object of the invention to provide a crop harvesting header of this type where the reversing of the mechanical input acts to reverse both the knife drive and the transfer assembly drive for release of blockages.

According to one aspect of the invention there is provided a crop harvesting header comprising:

a header frame for mounting on a support vehicle for transport of the header across ground carrying a standing crop for harvesting;

a sickle knife mounted across a forward end of the frame for cutting the standing crop, the sickle knife having a row of sickle blades which are movable in a reciprocating action relative to a row of sickle guards;

a first hydraulic drive motor for supplying driving rotation to the sickle knife for causing the reciprocating movement of the blades;

a crop transfer assembly for transporting the cut crop from the knife along the frame to a discharge opening of the frame;

at least one second hydraulic drive motor for supplying driving rotation to the crop transfer assembly for driving the crop transfer assembly;

a mechanical drive input on the frame for supplying drive to the header from a rotating drive member of the vehicle, the mechanical drive input being arranged such that the input can be driven by the drive member in a forward direction and a rearward direction;

a first pump arranged to be driven by the mechanical drive input in the forward direction thereof for supplying hydraulic fluid to the first hydraulic drive motor, the first pump being a piston pump arranged such that rotation of the input in the reverse direction causes no hydraulic fluid to be supplied;

a second pump driven by the mechanical drive input in the forward direction thereof for supplying hydraulic fluid to the second hydraulic drive motor, the second pump being arranged such that rotation of the input in the reverse direction causes hydraulic fluid to be supplied in the reverse direction;

and a hydraulic control circuit for controlling supply of fluid from the first pump and the second pump;

the hydraulic control circuit including a first circuit portion for communicating fluid from the first pump to the first motor and for returning fluid from the first motor;

the hydraulic control circuit including a second circuit portion for communicating fluid from the second pump to said at least one second motor and for returning fluid from said at least one second motor;

the hydraulic control circuit being arranged such that, when the second pump is driven by the drive input in the reverse direction, hydraulic fluid is supplied from the second pump to said at least one second motor in the reverse direction for driving said at least one second motor in the reverse direction;

and the hydraulic control circuit being arranged such that, when the second pump is driven by the drive input in the reverse direction, hydraulic fluid is supplied from the second pump to the first motor in the reverse direction for driving the first motor in the reverse direction.

Preferably the second pump is a gear pump.

Preferably the first drive motor is driven in the reverse direction at a rate which is slower than in the forward direction.

Preferably the hydraulic control circuit includes at least one and preferably two pilot controlled check valve for controlling supply of the fluid to the first motor from the second pump when the second pump is driven in the reverse direction for driving the first motor in the reverse direction.

Preferably the first motor and said at least one second motor is driven in the reverse direction in series by the second pump.

The present arrangement is particularly but not necessarily applicable to a header where the transfer assembly is provided by a pair of side drapers and a center feed draper and wherein the header is designed for mounting on a feeder house of a combine harvester.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
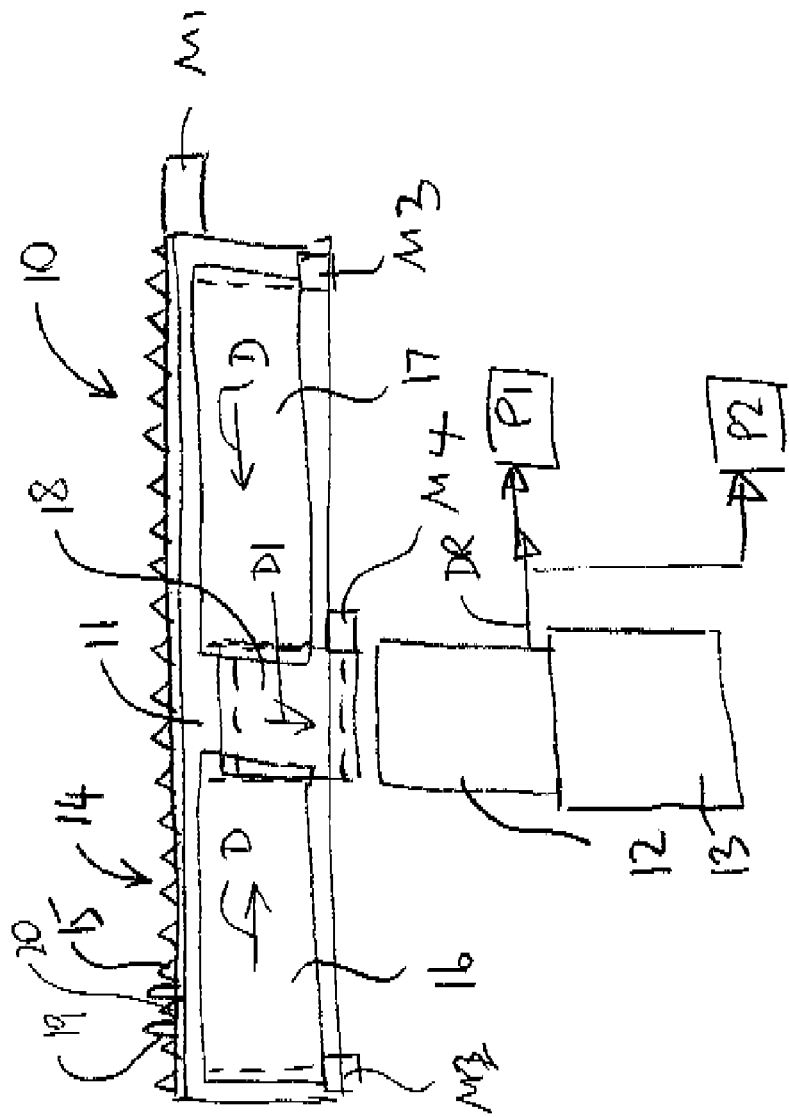
FIG. 1 is a schematic illustration of a header including driven components and showing the drive motors and drive pumps.

In FIG. 1 is shown schematically a header of the type with which the present invention is primarily concerned. The example of header shown is indicated at 10 and comprises a main header section 11 which is carried on the feeder house 12 of a combine harvester 13. The header carries on a suitable frame structure mounted on the feeder house a cutter bar generally indicated at 14 and including a sickle knife 15. The cutter bar and the knife system therefore acts to out a standing crop as the header is moved across the field in front of the combine harvester 13. A crop transfer arrangement for carrying the crop from the header table behind the cutter bar to the feeder house includes a pair of side drapers 16 and 17 which carry the material inwardly toward the center of the header frame structure and particularly to a feed draper 18 which is mounted so as to move rearwardly of the centre to carry the crop material to the feeder house.

These elements are shown only schematically since there are a number of prior arrangements showing details of these devices. In addition these devices represent only one example of an arrangement of this type with which the present invention may be used. Persons skilled in this art have knowledge of the structure of the suitable headers and the mounting and support of the various components so that there is no necessity to describe those components in detail herein.

The sickle knife is of the type including a series of knife guards 19 between which knife blade elements 20 are moved in reciprocating action so that the blades can move from a position at one guard to a position at the next adjacent guard in a cutting action so that cutting occurs as the blade moves into engagement with the next guard. It will be appreciated therefore that in a situation where a blockage occurs and the knife drive is stalled, it is necessary to reverse the knife drive to retract the blade away from a particular guard to release the material trapped between the blade and the guard.

The reciprocating knife is driven by a hydraulic motor M1. The mounting and arrangement of the motor M1 again will be well known to a person skilled in the art so that no detailed description of this mounting is necessary.

The side drapers 16 and 17 are driven respectively by drive motors M2 and M3. These motors cooperate with one of the end drive rollers of the respective draper so that the draper moves along its length in the direction along the header toward the center as indicated by the arrows D. The feed draper is driven by a motor M4 again mounted on one of the end rollers of the draper system so that the draper moves in the direction D1 toward the feeder house 12.

The feeder house includes a mechanical drive output indicated at DR. This mechanical drive output is connected to two hydraulic pumps P1 and P2 which provide hydraulic flow to the motors. In particular the pump P1 is arranged to drive the motor M1 and the pump P2 is arranged to drive the motors M2, M3 and M4.

It will be appreciated that the drive DR from the feeder house of the combine harvester is a mechanical drive which varies in rotation rate depending upon the drive to the feeder house. Thus the mechanical drive will vary in speed depending upon the drive speed of the combine harvester.

Figure 2:
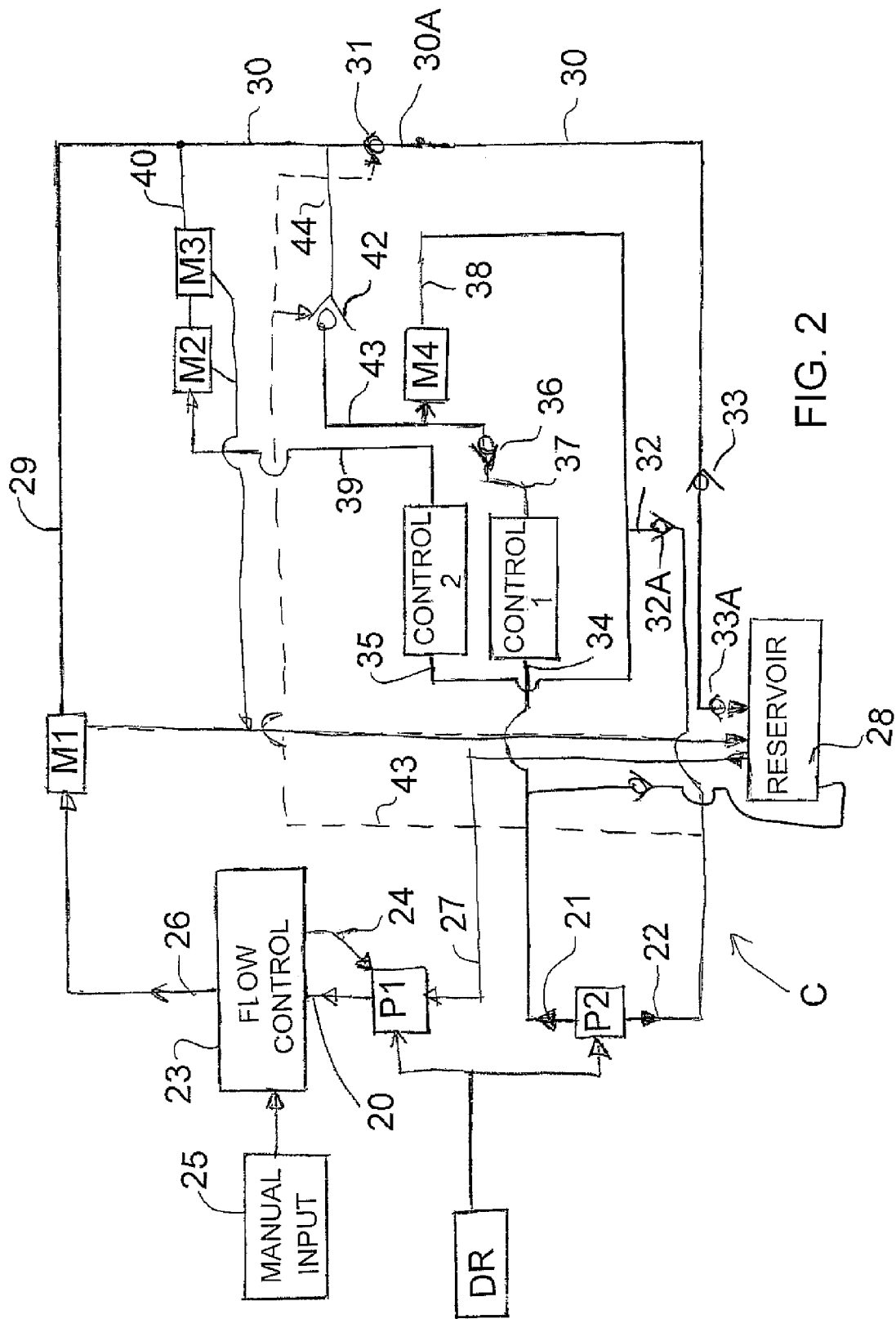
FIG. 2 is a schematic hydraulic circuit for the header of FIG. 1.

Turning now to FIG. 2 the same components are shown for control of the drive from the two pumps P1 and P2 to the motors M1, M2, M3 and M4 using a control circuit schematically indicated at C.

The pump P1 is selected to be of a type generally a piston type pump which provides output flow to an output line 20 when driven in a forward direction but provides no output flow in either direction when driven in reverse direction.

The pump P2 is of the type, commonly a gear type pump, in which drive of the pump P2 in a forward direction provides output flow on a line 21 and extracts fluid from an input line 22. In the event that the pump P2 is driven in reverse, the flow is reversed so that the input is carried by the line 21 and the output flow is applied at the line 22.

It will be appreciated that drive system DR is of a type which can be driven at variable speeds in the forward direction and also can be driven in a reverse direction for clearing any blockage in the feeder house. Arrangements of this type are well known to a person skilled in the art and are commonly used in combine harvesters with which the present invention is concerned.

It will be appreciated that pumps of the type P2 provide an output flow which varies in dependence upon the rate of input drive from the drive DR from the combine harvester. Changes in rate of flow of course are communicated to the motors driven by this pump so that variation will occur in the rate of drive to the elements driven by those motors. However the rate of drive of the side drapers 16 and 17 and of the feed draper 18 can vary without affecting the overall performance of the header and in many cases it is desirable that the rate of drive of these components varies in proportion to the rate of drive of the feeder house.

The knife speed can be manually adjustable but otherwise varies with the input speed.

As an alternative it is possible that, in respect of the pump P1 which drives the motor M1 and therefore drives the cutting knife, the rate of drive of the knife is adjustable by the operator to a required rate and is maintained at that rate regardless of changes of output speed of the drive DR from the combine harvester. It will be appreciated that a cutting action on the crop should be carefully controlled by the operator in dependence upon the conditions of the crop to be out and this rate of drive to the knife is in many cases independent of the rate of drive to the feeder house.

Thus, in the arrangement shown, the output from the pump P1 is supplied to a flow control system 23 which receives the flow from the output line 20 of the pump and provides feedback on a control line 24 to control the pump P1 to maintain the required output flow regardless of changes in rate of drive to the input. The pressure compensation system is controlled by a manual input 25 from the operator so that the operator can set the required flow rate required at an output line 26 from the pressure compensation system and the system automatically controls the pump P1 so that the required flow rate is maintained regardless of the input drive rate. Arrangements of this type are again commonly known by a person skilled in the art and are readily commercially available. This arrangement can be omitted if required and the knife drive adjusted manually.

The output line 26 provides fluid to the motor M1 to drive the motor at the selected required rate as set by the operator at the manual input 25.

However it will be appreciated that the pump P1 being of this type utilizing the piston pump system and the pressure compensation control cannot be reversed since reverse drive to the pump P1 simply cancels any output flow so that no flow is supplied to the output line 20.

Input fluid to the pump P1 is drawn from a line 27 which communicates with a reservoir 28 so that fluid is drawn from the reservoir 28 along the line 27 to the pump P1 to be supplied to the line 26 to the motor M1. From the motor M1 the fluid is returned along a line 29 which communicates with a further line 30 passing through a check valve 31, to a line 30A to return to the reservoir through a check valve 33 and a second check valve 33A.

The pump P2 when driven in forward direction supplies fluid under pressure along the line 21 feeds along input 34 to a control system indicated at control 1 which operates control of the supply of fluid through a check valve 36 to the motor M4.

The check valve 36 is located in a line 37 which communicates to the input of the motor M4. An output side of the motor M4 communicates fluid to a line 38 which connects to an input line 35 which supplies fluid through a control unit control 2 to a line 39 which supplies the fluid to the motors M2 and M3 in series. From the second of the two series motors, the fluid is discharged into a line 40 which connects to a line 30. The line 30 supplies the fluid through a line 32 to the line 22 so that the fluid is returned to the pump P2.

Thus it will be appreciated that driving of the pump P2 communicates fluid to the motor M2, M3 and M4 at a rate which varies in dependence upon the rate of drive to the pump P2. Control units control 1 and control 2 simply are used to actuate communication of fluid to the motors as required and is not intended to provide any variation to the drive rate. In the event that a blockage occurs, the operator conventionally reverses the drive to the feeder house thus reversing the drive DR. Many combine harvesters of this type include a drive reversal system for releasing such blockages so that the reversing action of the drive system reverses the drive to the components in the feeder house to carry the blockage, if it is occurred in the feeder house, forwardly out of the feeder house to be discharged in front of the feeder house.

It is highly desirable that this reversing action also effects reversing of the drive to at least the feed draper 18 so that the blockage material discharged from the front of the feeder house is carried away from the front of the feeder house by forward movement of the feed draper to discharge the blockage material over the front of the header.

Reversing of the drive to the side draper 16 and 17 is optional but in the arrangement as shown, these side drapers are also reversed in direction by reversing the motors M2 and M3.

As explained previously, it is highly desirable also that the knife drive motor M1 also be reversed. In a situation where the blockage has occurred in the feeder house, reversing the knife drive is of course of no importance. However a blockage which stalls the drive system can also occur at the knife so that it is highly desirable that reversing of the knife drive system can be effected simply by the same process used by the operator to reverse the whole drive system. In this way whenever a blockage occurs stalling the drive system, the operator can simply operate a reverse drive switch so that the drive to the system is wholly reversed and this will release the blockage causing the stall whether that blockage occurs in the feeder house, at the feed draper 18 or at the knife driven by the motor M1.

As reversal of the drive system to the pump P1 does not result in a reversal of the fluid flow through the circuit containing the pump P1 and the motor M1, it is necessary to effect reversal of the motor M1 using alternative arrangement. In the arrangement disclosed herein, the fluid flow from the pump P2 is used to reverse the motor M1.

Thus the system includes an additional check valve 42 and pilot control of the check valves 31 and 42 using a control line 43 which is responsive to positive pressure on the line 22.

When the drive DR is reversed, the pump P2 is also reversed thus reversing the flow so that line 21 moves to a low pressure condition and the flow is output to the line 22 providing a high pressure condition. This high pressure condition is detected by the sensor line 43 which actuates the valves 31 and 42. This actuation allows fluid to flow from the line 22, which is now under pressure, through a line 32 containing a check valve 32A and line 38 where the fluid flow passes through the motor M4 in the reverse direction.

Thus reversal of the pump P2 initiates drive to the motor M4 in the reverse direction so that the feed draper is driven in reverse as primarily required by this action. The back-check valve 36 prevents the output fluid from the motor M4 from entering the line 37. Instead the output from the motor M4 enters a line 43 and is allowed to pass through the pilot operated check valve 42 to flow through a line 44 to the line 30 to drain. The pilot operated valve 31 closes the line portion 30A thus forcing the fluid along the line 38 to the motor M4. Fluid from the line 44 thus enters the line 30 above the valve 31 and is divided to flow into the line 40 and into the line 29.

Flow along the line 29 enters the motor M1 to drive the motor M1 in reverse direction. Reverse flow through the motor M1 returns through the line 26 on the line 20 through the pump P1 and the line 27 to the reservoir.

Thus reversal of the drive DR supplies no output from the pump P1 but supplies reverse output through the pump P2. This reverse output is communicated using the circuit to drive the motor M4 in the reverse direction and also to drive the motor M1 in reverse direction. The size of the pumps and the rate of drive of the drive DR in the forward and reverse directions are selected so that the motor M1 is driven at a significantly slower rate in the reverse direction than in the forward direction. In this way the knife is moved gradually away from the blockage, if the blockage has occurred at the knife thus releasing the material that has caused the blockage and allowing it to be pulled or dropped from the knife so that further reciprocation of the knife can be recommenced.

The system can allow the selection for the motor P1 of a proper pressure compensation system enabling the knife drive to be properly and accurately controlled by the operator without dependence upon the rate of drive from the drive DR.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A crop harvesting header comprising:
 a header frame for mounting on a support vehicle for transport of the header across ground carrying a standing crop for harvesting;

a sickle knife mounted across a forward end of the frame for cutting the standing crop, the sickle knife having a row of sickle blades which are movable in a reciprocating action relative to a row of sickle guards;

a first hydraulic drive motor for supplying driving rotation to the sickle knife for causing the reciprocating movement of the blades;

a crop transfer assembly for transporting the cut crop from the knife along the frame to a discharge opening of the frame;

a second hydraulic drive motor for supplying driving rotation to the crop transfer assembly for driving the crop transfer assembly;

a mechanical drive input on the frame for supplying drive to the header from a rotating drive member of the vehicle, the mechanical drive input being arranged such that the input can be driven by the drive member in a forward direction and a rearward direction;

a first pump arranged to be driven by the mechanical drive input in the forward direction thereof for supplying hydraulic fluid to the first hydraulic drive motor, the first pump being arranged such that rotation of the input in the reverse direction causes no hydraulic fluid to be supplied;

a second pump driven by the mechanical drive input in the forward direction thereof for supplying hydraulic fluid to the second hydraulic drive motor, the second pump being arranged such that rotation of the input in the reverse direction causes hydraulic fluid to be supplied in the reverse direction;

and a hydraulic control circuit for controlling supply of fluid from the first pump and the second pump;

the hydraulic control circuit including a first circuit portion for communicating fluid from the first pump to the first motor and for returning fluid from the first motor;

the hydraulic control circuit including a second circuit portion for communicating fluid from the second pump to the second motor and for returning fluid from the second motor;

the hydraulic control circuit being arranged such that, when the second pump is driven by the drive input in the reverse direction hydraulic fluid is supplied from the second pump to the second motor in the reverse direction for driving the second motor in the reverse direction;

and the hydraulic control circuit being arranged such that, when the second pump is driven by the drive input in the reverse direction, hydraulic fluid is supplied from the second pump to the first motor in the reverse direction for driving the first motor in the reverse direction.

2. The crop harvesting header according to claim 1 wherein the second pump is a gear pump.

3. The crop harvesting header according to claim 1 wherein the first drive motor is driven in the reverse direction at a rate which is slower than in the forward direction.

4. The crop harvesting header according to claim 1 wherein the hydraulic control circuit includes at least one pilot controlled check valve for controlling supply of the fluid to the first motor from the second pump when the second pump is driven in the reverse direction for driving the first motor in the reverse direction.

5. The crop harvesting header according to claim 1 wherein the hydraulic control circuit includes a first and a second pilot controlled check valve for controlling supply of the fluid to the first motor from the second pump when the second pump is driven in the reverse direction for driving the first motor in the reverse direction.

6. The crop harvesting header according to claim 1 wherein the first and second motors are driven in the reverse direction in series by the second pump.

7. The crop harvesting header according to claim 1 wherein the first pump is includes a flow control compensation system.

* * * * *